United States Patent
Miyabayashi et al.

[11] Patent Number: 5,162,170
[45] Date of Patent: Nov. 10, 1992

[54] ELECTRODE FOR SECONDARY BATTERY

[75] Inventors: Mitsutaka Miyabayashi; Hiroshi Yui, both of Yokkaichi, Japan

[73] Assignee: Mistubishi Petrochemical Co., Ltd., Tokyo, Japan

[21] Appl. No.: 554,137

[22] Filed: Jul. 16, 1990

[30] Foreign Application Priority Data

Jul. 21, 1989 [JP] Japan .................................. 1-187411
Jul. 21, 1989 [JP] Japan .................................. 1-187412

[51] Int. Cl.$^5$ ....................... H01M 4/38; H01M 4/62
[52] U.S. Cl. ..................................... 429/94; 429/217; 429/218
[58] Field of Search ............... 429/236, 245, 217, 218, 429/94, 234

[56] References Cited

U.S. PATENT DOCUMENTS

| | | |
|---|---|---|
| 3,856,574 | 12/1974 | Amagi et al. . |
| 4,271,242 | 6/1981 | Toyoguchi et al. ................. 429/194 |
| 4,615,959 | 10/1986 | Hayashi et al. . |
| 4,668,595 | 5/1987 | Yoshino et al. . |
| 4,702,977 | 10/1987 | Hiratsuka et al. . |
| 4,717,595 | 1/1988 | Watanabe et al. ............... 429/217 X |
| 4,725,422 | 2/1988 | Miyabayashi et al. . |
| 4,814,242 | 3/1989 | Maxfield et al. ..................... 429/217 |
| 4,863,813 | 9/1989 | Dyer . |
| 4,960,655 | 10/1990 | Hope et al. ......................... 429/245 X |
| 4,980,250 | 12/1990 | Takahashi et al. ............. 429/217 X |

Primary Examiner—Stephen Kalafut
Attorney, Agent, or Firm—Frishauf, Holtz, Goodman & Woodward

[57] ABSTRACT

An electrode for a secondary battery, comprising a net or sheet made of a metal having laminated thereon a mixture comprising 85 to 99.9% by weight of a carbonaceous material and 0.1 to 15% by weight of an elastomer. The carbonaceous material has a hydrogen/carbon (H/C) atomic ratio of less than 0.15, a spacing ($d_{002}$) of the (002) plane according to an X-ray wide angle diffraction method of 3.37 Å to 3.75 Å, a volume average particle size of 0.5 μm and a total fine pore volume of $1.5 \times 10^{-3}$ ml/g or more. Lithium or a material substantially comprising lithium is carried on the carbonaceous material. The electrode has a thickness of 5 to 500 μm. The resultant electrode has an high energy density, and has the requisite flexibility to obtain a coil-shaped electrode.

19 Claims, 2 Drawing Sheets

ELECTRODE FOR SECONDARY BATTERY

BACKGROUND OF THE INVENTION

This invention relates to an electrode for a secondary battery having a high capacity and excellent charging and discharging characteristics. Further, it pertains to an electrode for a secondary battery which can constitute a cylindrical secondary battery as a flexible and coil-shaped electrode or a sheet-shaped secondary battery as a thin sheet-shaped electrode, particularly an electrode for a lithium secondary battery of which the active substance is lithium or an alkali metal composed mainly of lithium.

As the electrode for lithium secondary battery, it has been proposed to use an electroconductive polymer such as polyacetylene.

However, an electroconductive polymer is not sufficient in the doped amount of lithium ions, namely electrode capacity and stable charging and discharging characteristics.

Also, an attempt has been made to use lithium metal as the negative electrode of lithium secondary battery, but in this case, the charging and discharging cycle characteristics are not extremely good. More specifically, during discharging of the battery, lithium moves as lithium ions from the negative electrode body into an electrolyte, while during charging the lithium ions are again electrodeposited as metallic lithium onto the negative electrode. By repeating such charging and discharging cycle, the metallic lithium electrodeposited by accompaniment with such cycle becomes shaped in a dendrite. Since the dendrite-shaped lithium is a very active substance, it decomposes the electrolyte, thereby causing an inconvenience to occur that the charging and discharging cycle characteristics of the battery are deteriorated. Further, when this grows until the dendrite-shaped metallic lithium electrodeposited product reaches the positive electrode through the separator, there ensues the problem of causing short-circuit phenomenon to occur. That is, the charging and discharging cycle life is short.

For avoiding such problems, it has been attempted to use a carbonaceous material of a sintered organic compound as the negative electrode and carry lithium or an alkali metal composed mainly of lithium thereon. By this, the charging and discharging characteristics of the negative electrode could be dramatically improved, but on the other hand, an electrode molding material by use of this carbonaceous material is poor in flexibility, and no satisfactory electrode shaped in sheet or coil could be obtained.

SUMMARY OF THE INVENTION

An object of the present invention, under the state of the art as described above, is to provide a negative electrode for a lithium secondary battery having large electrode capacity, excellent charging and discharging cycle characteristics, and also flexibility.

The present inventors have studied intensively about the negative electrode in order to solve the problems as described above, and consequently found that an electrode having an active substance carried on a carrier comprising a mixture of a carbonaceous material and a binder as described below is very effective for accomplishing the above object, to accomplish the present invention.

More specifically, the present invention is an electrode for secondary battery, comprising lithium or an alkali metal composed mainly of lithium doped as the active substance in a carrier containing 70 to 99.7 % by weight of a carbonaceous material shown below by (a) and 0.1 to 30 % by weight of an elastomer:

(a) a carbonaceous material with a hydrogen/carbon (H/C) atomic ratio less than 0.15, a spacing ($d_{002}$) of the (002) plane according to the X-ray wide angle diffraction method of 3.37 Å or more and a crystallite size in the C-axis direction (Lc) of 220 Å or less.

DESCRIPTION OF THE PREFERRED EMBODIMENTS

Figure 1:
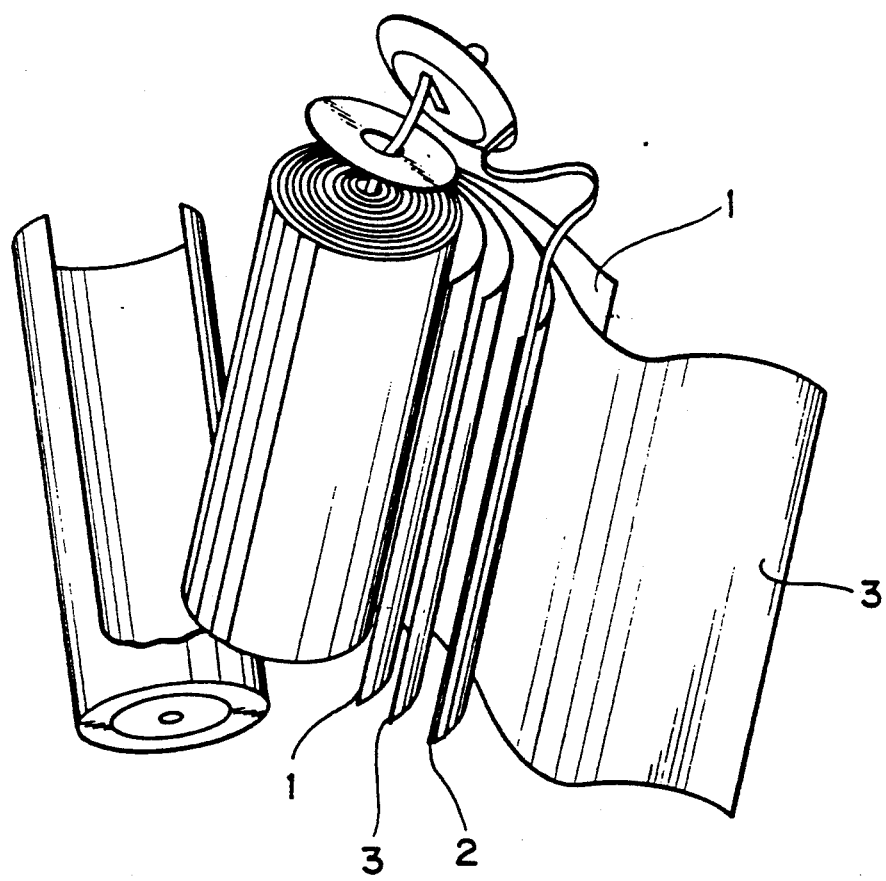
FIG. 1 is a perspective view showing the constitution of the battery in Example 1, in which 1 shows a positive electrode, 2 shows a negative electrode and 3 shows a separator (including electrolyte).

The carbonaceous material has the following characteristics:

(1) The atomic ratio of hydrogen/carbon (H/C) is less than 0.15; and (2) the spacing ($d_{002}$) of the (002) plane according to the X-ray wide angle diffraction method is 3.37 Å or more and the crystallite size in the C-axis direction (Lc) is 220 Å or less. In the carbonaceous material, other atoms such as nitrogen, oxygen and halogen may be also present at a ratio preferably of 7 mole % or less, more preferably 4 mole % or less, particularly preferably 2 mole % or less.

H/C is preferably less than 0.10, more preferably less than 0.07, and particularly preferably less than 0.05.

The spacing (dO02) of the (002) plane is preferably 3.39 to 3 75 Å, more preferably 3.41 to 3.70 Å, particularly preferably 3.45 to 3.70 Å, and the crystallite size in the c-axis direction Lc is 220 Å or less, preferably 5 to 150 Å, more preferably 10 to 80 Å, and particularly preferably 12 to 70 Å.

When either one of these parameters, namely H/C, $d_{002}$ and Lc falls out of the above-specified ranges, the overvoltage during charging and discharging in the electrode becomes greater, whereby not only a gas is generated from the electrode to markedly impair the safety of the electrode, but also the charging and discharging cycle characteristics are lowered.

Further, the carbonaceous material to be used for the electrode of the present invention preferably has the characteristics as described below.

That is, in the Raman spectrum analysis by use of an argon ion laser beam with a wavelength of 5145 Å, the G value as defined by the following formula:

$$G = \frac{\text{Integrated value of spectrum intensity in the wave number region of } 1580 \pm 100 \text{ cm}^{-1}}{\text{Integrated value of spectrum intensity in the wave number region of } 1360 \pm 100 \text{ cm}^{-1}}$$

is preferably less than 2.5, further preferably less than 2.0, particularly from 0.2 to less than 1.2.

Here, G value refers to the integrated value (area intensity) of the spectrum intensity within the range of the wave number $1580 \pm 100$ cm$^{-1}$ divided by the area intensity within the range of the wave number $1360\pm100$ cm$^{-1}$ in the spectrum intensity curve recorded on the chart when Raman spectrum analysis is performed by use of an argon ion laser beam of a wavelength of 5145 Å for the above-mentioned carbonaceous material, and corresponds to a measure of the graphitization degree of the carbonaceous material.

In other words, the carbonaceous material has a crystalline portion and a non-crystalline portion, and the G value can be said to be a parameter indicating the ratio of the crystalline portion of the carbonaceous structure.

Further, the carbonaceous material to be used for the electrode of the present invention desirably satisfies the following conditions.

That is, the two-fold distance $a_0 (=2d_{110})$ of the spacing ($d_{110}$) of the (110) plane in the X-ray wide angle diffraction analysis is preferably 2.38 to 2.47 Å, further preferably 2.39 to 2.46 Å, and the size La of the crystallite in the a-axis direction is preferably 10 Å or more, further preferably 15 to 150 Å, particularly preferably 19 Å to 70 Å.

Further, the particles of the carbonaceous material have a volume average particle size of 200 μm or less, preferably 0.5 to 150 μm, more preferably 2 to 100 μm, particularly preferably 5 to 30 μm.

Further, the carbonaceous material has internally fine pores, and the total fine pore volume is preferably $1.5\times10^{-3}$ ml/g or more. More preferably, the total fine pore volume is $2.0\times10^{-3}$ ml/g or more, further preferably $3.0\times10^{-3}$ to $8\times10^{-2}$ ml/g, particularly preferably $4.0\times10^{-3}$ to $3\times10^{-2}$ ml/g.

The total fine volume and the average fine pore size as described below are determined by measuring the amount of the gas adsorbed onto the sample under some equilibrium pressures or the amount of the gas released by use of the quantitative volume method, and determined from the amount of the gas adsorbed on the sample.

The total fine pore volume is determined from the total amount of the gas adsorbed at a relative pressure P/Po =0.995, supposing that the fine pores are filled with liquid nitrogen.

Here,

P: vapor pressure of adsorbed gas (mmHg) and
Po: saturated vapor pressure of adsorbed gas at cooling temperature (mmHg).

Further, from the nitrogen gas amount adsorbed ($V_{ads}$), the liquid nitrogen amount ($V_{liq}$) filled in the fine pores is calculated by use of the following formula (1) to determine the total fine pore volume:

$$V_{liq} = \frac{P_a V_{acs} V_m}{RT}. \qquad (1)$$

Here, Pa and T are atmospheric pressure (Kgf/cm$^2$) and temperature (.K), R is the gas constant. $V_m$ is a molecular volume of the gas adsorbed (34.7 cm$^3$/mole for nitrogen).

The average fine pore radius ($\gamma P$) is preferably 8 to 100 Å. More preferably, it is 10 to 80 Å, further preferably 12 to 60 Å, particularly preferably 14 to 40 Å.

The average fine pore radius ($\gamma p$) is determined from the $V_{liq}$ determined from the formula (1) as mentioned above and the BET specific area: S by use Of the following formula (2):

$$\gamma_p = \frac{2 V_{liq}}{S}. \qquad (2)$$

Here, the fine pore is supposed to be cylindrical.

The carbonaceous material as described above can be generally obtained by carbonization of an organic compound by heating and decomposing it at a temperature of 300 to 3000 ° C. under an inert gas stream.

Specific examples of the organic compound which is the starting source may include any desired organic polymeric compound including cellulose resins; phenol resins; acrylic resins such as polyacrylonitrile and poly-(α-halogenated acrylonitrile); halogenated vinyl resins such as polyvinyl chloride, polyvinylidene chloride and chlorinated polyvinyl chloride; polyamideimide resins; polyamide resins; conjugated resins such as polyacetylene and poly(p-phenylene): condensed cyclic hydrocarbon compounds comprising two or more monocyclic hydrocarbon compounds having 3 or more membered ring such as naphthalene, phenanthrene, anthracene, triphenylene, pyrene, chresene, naphthacene, picene, perylene, pentaphene and pentacene condensed mutually to each other, or derivatives of the above-mentioned compounds such as carboxylic acids, carboxylic acid anhydrides, carboxylic acid imides, various pitches composed mainly of mixtures of the above-mentioned respective compounds: condensed heterocyclic compounds comprising 2 or more heteromonocyclic compounds having 3 or more membered ring such as indole, isoindole, quinoline, isoquinoline, quinoxaline, phthalazine, carbazole, acridine, phenazine, phenathridine bonded together to each other, or bonded to one or more monocyclic hydrocarbon compound having 3 or more membered ring, derivatives of the above-mentioned respective compounds such as carboxylic acids, carboxylic acid anhydrides, carboxylic acid imides; further benzene and derivatives thereof such as carboxylic acids, carboxylic acid anhydrides, carboxylic acid imides, namely 1,2,4,5-tetracarboxylic acid, dianhydride thereof, or diimide thereof.

Also, by use of a carbonaceous material such as carbon black and coke as the starting source, this may be further heated to progress appropriately carbonization for use as the carbonaceous material of the electrode of the present invention.

The carrier of the present invention is prepared by molding the particles of the above-described carbonaceous material with an elastomer as the binder into the form of an electrode.

As the elastomer, styrene-butadiene rubber, isoprene rubber, butadiene rubber, ethylene-propylene rubber and butyl rubber may be employed.

As the styrene-butadiene rubber, for example, those conventionally called SBR (styrene-butadiene rubber) may be employed.

SBR may include those prepared by emulsion polymerization and those prepared by solution polymerization. The emulsion polymerized SBR is prepared by random copolymerization of styrene and butadiene emulsified with water as the dispersing medium. As the polymerization initiator, potassium persulfate (hot rubber) or a redox initiator (cold rubber) may be employed, and the polymerization may be considered to proceed in the form of radical polymerization.

As the oxidizing agent in the redox system initiator, organic peroxides may be employed, and as the reducing agent, divalent iron and tetraethylenepentamine may be employed.

A composition of styrene in the styrene-butadiene rubber (SBR) according to the emulsion polymerization to be used in the present invention may be 1 to 70 mole %, preferably 1.8 to 50 mole %, more preferably 10 to 30 mole %, and particularly preferably 12 to 20 mole %.

A linkage of butadiene in the styrene-butadiene rubber (SBR) according to the emulsion polymerization may include 1,2-linkage, 1,4-linkage (cis) and 1,4-linkage (trans), and may generally comprise 8 to 25 mole % of 1,2-linkage, 50 to 85 mole % of 1,4-linkage (trans) and 8 to 25 mole % of 1,4-linkage (cis). More preferably, 1,2-linkage may be 12 to 18 mole %, 1,4-linkage (trans) 60 to 75 mole % and 1,4-linkage (cis) 10 to 20 mole %.

The emulsion polymerized styrene-butadiene rubber (SBR) preferably has a number average molecular weight of 10,000 to 500,000, more preferably 20,000 to 400,000, and further preferably 30,000 to 300,000.

The styrene-butadiene rubber (SBR) prepared by the solution polymerization is prepared by use of an organic lithium catalyst in an organic solvent such as a hydrocarbon solution. Sometimes, bulk polymerization technique can be also employed.

The styrene-butadiene rubber (SBR) prepared by the solution polymerization generally has a styrene content of 1 to 70 mole %, preferably 1.8 to 50 mole %, more preferably 10 to 45 mole %, and particularly preferably 15 to 40 mole %.

A microstructure of the butadiene moiety may be preferably 8 to 50 mole % for 1,2-linkage unit, 30 to 80 mole % for 1,4-linkage unit (trans) and 8 to 50 mole % for 1,4-linkage unit (cis). More preferably, it may be 10 to 40 mole % for 1,2-linkage unit, 40 to 70 mole % for 1,4-linkage unit (trans) and 10 to 40 mole % for 1,4-linkage unit (cis).

Isoprene rubber is prepared by the solution polymerization of isoprene with the use of a Ziegler catalyst or an alkyllithium as the catalyst.

A microstructure of the linkage of isoprene unit may be preferably 90 mole % or more for cis-1,4-linkage, more preferably 91 mole % or more, but generally 91 to 99 mole %.

A number average molecular weight may be preferably 50,000 to 5,000,000, more preferably 70,000 to 3,000,000, and particularly preferably 80,000 to 2,500,000.

The butadiene rubber may be classified into a high-cis butadiene rubber and a low-cis butadiene rubber depending on the linkage unit of butadiene.

The high-cis butadiene rubber is prepared by solution polymerization of butadiene by use of a Ziegler catalyst of Ti system, Co system and Ni system. A microstructure of the linkage of butadiene unit may be preferably 80 mole % or more of 1,4-linkage (cis), preferably 90 mole % or more, more preferably 92 mole % or more, but generally 92 to 98 mole %.

A number average molecular weight may be preferably 30,000 to 1,000,000, more preferably 40,000 to 800,000, and particularly preferably 50,000 to 600,000.

On the other hand, the low-cis butadiene rubber is prepared by the solution polymerization with a lithium system catalyst. A linkage unit of butadiene is preferably 20 to 50 mole % for 1,4-linkage (cis), 40 to 70 mole % for 1,4-linkage (trans) and 5 to 20 mole % for 1,2-linkage (trans), more preferably 30 to 40 mole % for 1,4-linkage (cis), 50 to 60 mole % for 1,4-linkage (trans) and 8 to 11 mole % for 1,2-linkage (trans).

A number average molecular weight may be preferably 30,000 to 200,000, more preferably 40,000 to 100,000, and particularly preferably 50,000 to 70,000.

Ethylene-propylene rubber (EPR) is prepared by the solution polymerization of ethylene and propylene by use of a Ziegler catalyst.

It is a random copolymer of ethylene and propylene, and can also contain a small amount (preferably 10 mole % or less) of a diene component such as ethylidene norbornene and dicyclopentadiene.

An ethylene content in the ethylene-propylene rubber (EPR) may be preferably 20 to 80 mole %, more preferably 30 to 75 mole %, and particularly preferably 40 to 70 mole %.

Butyl rubber is obtained by the random copolymerization of isobutylene and a small amount of isoprene by use of a cation polymerization catalyst.

A composition of isobutylene in the copolymer is preferably 95 mole % or more. A composition of isoprene in the copolymer is preferably 0.3 to 3 mole %, and more preferably 0.6 to 2.5 mole %.

A number average molecular weight is preferably 200,000 to 700,000, more preferably 300,000 to 600,000, and particularly preferably 350,000 to 500,000.

Also, an ethylene-vinyl acetate a random copolymer, random copolymer of ethylene and an α-olefin with 3 to 12 carbon atoms, and a random copolymer of propylene and an α-olefin with 2 or 4 to 12 carbon atoms could be used.

An ethylene-vinyl acetate copolymer is prepared by the radical copolymerization of ethylene and vinyl acetate at high temperature and under high pressure, and comprises preferably 7 % by weight to 40 % by weight, more preferably 10 % by weight to 35 % by weight of vinyl acetate.

A copolymer of ethylene and an α-olefin with 3 to 12 carbon atoms is prepared by copolymerization of ethylene and an α-olefin with 3 to 12 carbon atoms with a Ziegler catalyst, and as the α-olefin with 3 to 12 carbon atoms, propylene, butene and hexene may be preferably employed, and the content of the α-olefin with 3 to 12 carbon atoms in the copolymer may be preferably 5 % by weight to 40 % by weight, more preferably 7 % by weight to 30 % by weight.

A copolymer of propylene and ethylene or an α-olefin with 4 to 12 carbon atoms is also obtained by copolymerization of propylene and ethylene or an α-olefin with 4 to 12 carbon atoms with a Ziegler catalyst, and butene or hexene is preferred as the α-olefin with 4 to 12 carbon atoms.

A content of ethylene or an o-olefin with 4 to 12 carbon atoms in the copolymer may be preferably 5 % by weight to 40 % by weight, more preferably 7 % by weight to 30 % by weight.

As the elastomer to be used in the present invention, an elastomer having thermoplasticity is particularly preferred.

As the thermoplastic elastomer to be used in the present invention, there may be included styrene type thermoplastic elastomers, for example, styrene-butadiene-styrene block copolymer (SBS), styrene-isoprene-styrene block copolymer (SIS), styrene-butadiene block copolymer (SB), styrene-isoprene block copolymer (SI), and hydrogenated products of these, such as styrene-ethylene-butylene-styrene block copolymer (SEBS), styrene-ethylene-propylene-styrene block copolymer (SEPS) and styrene-ethylene-propylene block copolymer (SEP). Also, polyester type thermoplastic elastomer, polyurethane type thermoplastic elastomer, polyamide type thermoplastic elastomer and syndiotactic 1,2-polybutadiene can be also used.

styrene type thermoplastic elastomer is a thermoplastic elastomer comprising a polystyrene moiety as the resin component and a polybutadiene moiety or polyisoprene moiety, or an ethylene-butylene moiety, ethylene-propylene moiety as the rubber component.

In the following, structures of styrene type thermoplastic elastomers are schematically illustrated.

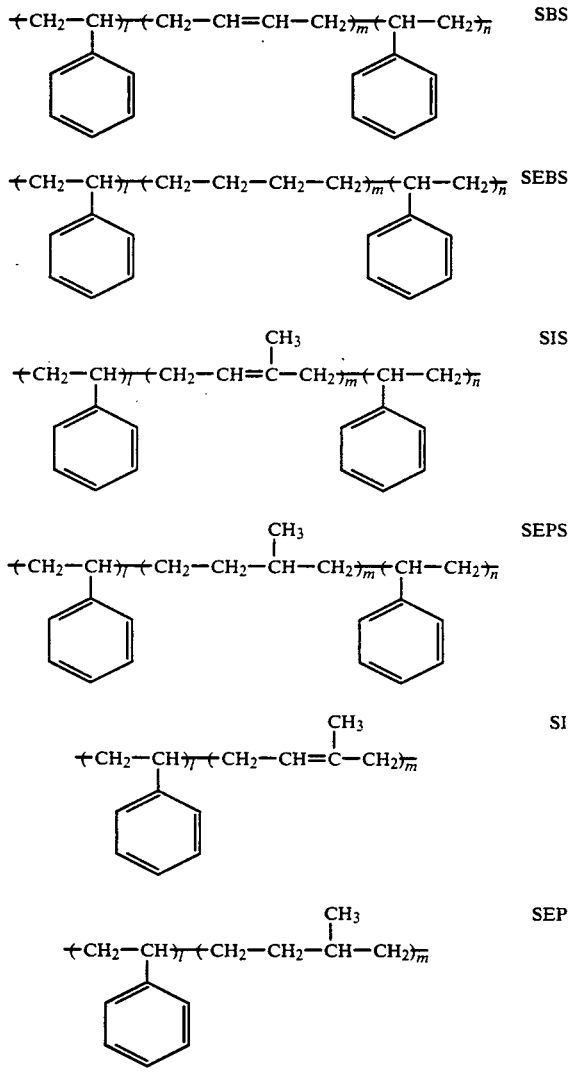

wherein l, m and n are arbitrary integers, preferably 3 or more, and more preferably 5 or more.

A styrene content in the above-described styrene type thermoplastic elastomer may be preferably 7 % by weight to 60% by weight, more preferably 10 % by weight to 50 % by weight.

A number average molecular weight of the above-described styrene type thermoplastic elastomer may be preferably 2000 to 500,000, more preferably 5,000 to 300,000, and particularly preferably 7,000 to 200,000.

A polyester type thermoplastic elastomer is a thermoplastic elastomer comprising a polyester moiety as the resin component and a polyether moiety as the rubber component.

Structures of the polyester type thermoplastic elastomers are schematically illustrated below.

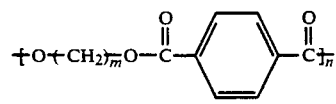

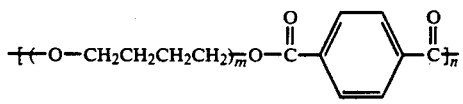

wherein m and n satisfy the relations of $1 \leq m \leq 12$ and $3 \leq n \leq 50$.

The polyurethane type thermoplastic elastomer is a thermoplastic elastomer comprising a polyurethane moiety as the resin component and a polyether or a polyester as the rubber component.

The polyamide type thermoplastic elastomer is a thermoplastic elastomer comprising a polyamide moiety as the resin component and a polyether or a polyester as the rubber component.

Structures of the polyamide type thermoplastic elastomers are schematically illustrated below.

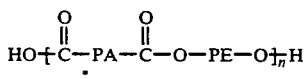

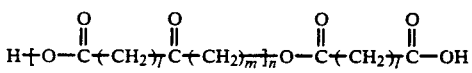

wherein PA means polyamide, PE means polyether and l, n and m satisfy the relations of $1 \leq l \leq 12$, $1 \leq m \leq 12$ and $3 \leq n \leq 50$, respectively.

As the carrier to be used for the electrode for secondary battery of the present invention, a mixture of particles of the carbonaceous material as described above with the elastomer may be employed. The mixing ratio of particles of the carbonaceous material with the elastomer may be 70 to 99.9 % by weight of the carbonaceous material in the mixture, preferably 80 to 99.5 % by weight, more preferably 85 to 99 % by weight, and particularly preferably 90 to 98% by weight.

The method for mixing particles of the above-described carbonaceous material with the elastomer can be practiced by mechanically mixing the particles of the carbonaceous material with the particles of the elastomer, followed by compression molding, preferably under heating.

It is also preferred to mix the elastomer in fibrous shape instead of particles, and also an emulsion can be formed with the elastomer and the emulsion mixed with the carbonaceous material particles, followed by drying.

Also, the carbonaceous material particles can be also coated with the elastomer, and then shaped by heating under pressurization.

As the coating method, the elastomer is generally dissolved in an organic solvent without applying cross-linking treatment, and the solution containing the rubber dissolved therein is attached onto the surface of the particles of the carbonaceous material as described above. Then, the coated particles are dried to evaporate the solvent to have the rubber attached onto the surface of the carbonaceous material particles.

The thermoplastic elastomer and the soft resin described above are also dissolved similarly in an organic solvent, then the solution is attached onto the surface of the carbonaceous material particles, followed by evaporation of the solvent, to have the elastomer attached onto the surface of the carbonaceous material particles.

As the mode of attaching the elastomer onto the surface of the particles of the carbonaceous material as described, there may be included (1) the mode in which the surface of the particles of the carbonaceous material is coated on the whole surface with a thin film of the elastomer (preferably a thickness of ⅓ or less, more preferably 1/5, further preferably 1/10, of the average particle size of the particles of the carbonaceous material), (2) the mode in which the surface of the particles of the carbonaceous material is coated with the elastomer similarly as in (1), but not on the whole surface, but partially over the surface area preferably of 4/5, more preferably 1/10 to 3/5 of the whole surface area of the particles of the carbonaceous material, (3) the mode in which the elastomer is attached in particulate form with a size preferably of ⅓ or less, more preferably ¼ or less, particularly preferably 1/5 or less of the average particle size of the particles of the carbonaceous material, partially on the surface of the carbonaceous material particles, and (4) the mode in which the elastomer is attached in fibrous form with a size preferably of ⅓ or less, more preferably 1/5 or less, particularly preferably ¼ or less of the average size of the particles of the carbonaceous material partially on the surface of the carbonaceous material particles.

Anyway, rather than the mode in which the whole surface of the particles of the carbonaceous material as described above is coated with the elastomer, the mode in which preferably 4/5 or less of the surface of the particles of the carbonaceous material, more preferably 3/5 or less, further preferably 1/50 to ½, is coated with the elastomer may be suitable from the standpoint of enhancing the electrode performances. Also, there may be employed (5) the mode in which preferably 60 to 5 % by weight, more preferably 50 to 10 % by weight, particularly preferably 40 to 15 % by weight of the carbonaceous material particles coated with the elastomer according to the method as described above are mixed with preferably 40 to 95 % by weight, more preferably 50 to 90 % by weight, particularly preferably 60 to 85 % by weight of the carbonaceous material particles which are not coated.

As the method for coating the surface of the particles of the carbonaceous material with the elastomer as described above, for example, the methods as described below can be employed.

The elastomer as described above can be dissolved in an organic solvent such as toluene and benzene, under heating or under normal temperature, the solution is mixed with the particles of the carbonaceous material as described above, and then the solvent is evaporated to have the elastomer attached onto the surface of the particles of the carbonaceous material.

Also, simultaneously with blowing of the solution containing the elastomer as described above dissolved therein, the particles of the carbonaceous material as described above can be dispersed and fed into the same space, thereby attaching the solution having the elastomer dissolved therein onto the surface of the particles of the carbonaceous material, followed by evaporation of the solvent in a hot air stream, thereby attaching the elastomer components, etc. onto the surface of the particles of the carbonaceous material.

Also, the above-described particles of the carbonaceous material can be dispersed and contacted at the nozzle pipe surface where the solution having the above-described elastomer dissolved therein flows, followed by drying of the solvent under hot air, thereby attaching the elastomer onto the surface of the particles of the carbonaceous material.

The carrier of the present invention can also have a metal capable of forming an alloy with the active substance or an alloy of said active substance added therein.

As described above, the active substance is Li or an alkali metal, but it is generally preferred to employ an alloy of Li or a metal capable of forming an alloy with Li.

The alloy has a composition (molar composition) which is now represented by, for example, $Li_xM$ (here x is the molar ratio relative to the metal M). As the other metals used as M, there may be included, for example, aluminum (Al), lead (Pb), zinc (Zn), tin (Sn), bismuth (Bi), indium (In), magnesium (Mg), gallium (Ga), cadmium (Cd), silver (Ag), silicon (Si), boron (B), gold (Au), platinum (Pt), palladium (Pd) and antimony (Sb), preferably Al, Pb, In, Bi and Cd, further preferably Al, Pb and In, and particularly preferably Al.

In the alloy, other metals than the metals as mentioned above may be also contained within the range of 50 mole % or less.

In $Li_xM$, it is preferred that x satisfies $0 < x \leq 9$, more preferably $0.1 \leq x \leq 5$, further preferably $0.5 \leq x \leq 3$ and particularly preferably $0.7 \leq x \leq 2$.

As the alloy $(Li_xM)$ of the active substance, one or more kinds of alloys can be employed.

As the metal capable of forming an alloy with the active substance, one or more kinds of the above-mentioned metal (M) can be employed.

The ratio of the metal (M) capable of forming an alloy with the active substance or the alloy $(Li_xM)$ of the active substance in the carrier may be preferably 60% by weight or less, more preferably 5% by weight to 50% by weight, further preferably 7% by weight to 40% by weight, and particularly preferably 10% by weight to 30% by weight.

The metal (M) capable of forming an alloy with the active substance or the alloy $(Li_xM)$ of the active substance is preferably used in particle form.

The particles of the metal (M) capable of forming an alloy with the active substance or the alloy $(Li_xM)$ of the active substance has a volume average particle size of 150 μm or less, preferably 0.5 μm to 100 μm, more preferably 1 μm to 60 μm, and particularly preferably 2 μm to 20 μm.

Also, the metal (M) capable of forming an alloy with the active substance or the alloy $(Li_xM)$ of the active substance is used in the form attached on the surface of the carbonaceous material or in the pore of the carbonaceous material.

The electrode for secondary battery of the present invention can be molded as described below.

That is, a mixture of particles of the carbonaceous material and a styrene type thermoplastic elastomer is compression molded into any desired shape such as a sheet and a film, and the compression molding temperature may be preferably 50 to 130° C., more preferably 80 to 120° C. The compression molding pressure may be preferably 1 to 200 $T/cm^2$, more preferably 5 to 100

T/cm$^2$, and compression molding is carried out preferably for 1 second to 30 minutes, more preferably for 3 seconds to 10 minutes.

The electrode for secondary battery of the present invention can further have a net or a sheet of a metal such as Ni, Cu and Al as the core material, on which a mixture of the particles of the carbonaceous material and the styrene type thermoplastic elastomer as described above is pressure adhered, whereby the balance between flexibility and strength can be well maintained.

The thickness of the sheet electrode is 5 to 500 μm, preferably 20 to 300 μm, more preferably 50 to 200 μm.

As the method for carrying the active substance, there are the chemical method, the electrochemical method and the physical method. For example, it is possible to apply the method in which the carrier is dipped in an electrolyte containing lithium ions or alkali metal ions of a predetermined concentration, and lithium is used as an opposite electrode to carry out electrolytic impregnation with the carrier as the anode, or the method in which lithium powder is mixed in the process of obtaining a molded product of the carrier.

An amount of lithium thus previously carried on the negative electrode carrier may be preferably 0.010 to 0.250 g, more preferably 0.020 to 0.20 g, further preferably 0.025 to 0.15 g, particularly preferably 0.030 to 0.12 g, most preferably 0.040 to 0.100 g, per 1 g of the carrier.

The electrode for secondary battery of the present invention is generally used as the negative electrode and opposed to a positive electrode through an intermediary separator.

The electrode for secondary battery has excellent flexibility and flexural strength, and can be applied as the electrode for various secondary batteries of sheet shape, square shape and cylindrical shape.

For example, as shown in FIG. 1, the positive electrode body 1 and the negative electrode body 2 of the present invention can be rolled in shape of coil in the form opposed to each other with an intermediary separator 3, which are housed in a cylindrical vessel to form a cylindrical secondary battery.

The material of the positive electrode is not particularly limited, but a metal chalcogen compound such as an oxide of vanadium, a sulfide of vanadium, an oxide of manganese, an oxide of molybdenum, a sulfide of molybdenum, an oxide of chromium, an oxide of titanium, a sulfide of titanium, a complexed material of the above oxide and a complexed material of the above sulfides can be used. Preferably $V_2O_5$, $MnO_2$, $TiS_2$, $TiS_2$, $LiCoO_2$, $MoS_2$, $MoS_3$, $WO_3$, $Cr_3O_8$, $Cr_2O_5$, $V_6O_{13}$, $VO_2$, $MoV_2O_8$ and $V_2S_5$ can be used. Also, an electroconductive polymer such as polyaniline and polypyrrole can be used.

The separator for holding the electrolyte is formed by use of a material excellent in liquid holding characteristic such as nonwoven fabric of polyolefin resin, and the separator is impregnated with a non-aqueous electrolytic solution comprising an electrolyte such as $LiClO_4$, $LiBF_4$, $LiAsF_4$ and $LiPF_4$ dissolved at a predetermined concentration in an aprotic organic solvent such as propylene carbonate, 1,3-dioxorane and 1,2-dimethoxyethane.

It is also possible to have a solid electrolyte which is a conductor for lithium or alkali metal ions interposed between the positive electrode body and the negative electrode body.

In the battery thus constituted, at the negative electrode, active substance ions are carried onto the carrier during charging, and the active substance ions in the carrier are released during discharging, whereby the electrode reaction of charging and discharging proceeds.

On the other hand, at the positive electrode, in the case of a metal chalcogenide compound, active substance ions of the positive electrode body are released during charging, and the active substance ions carried during discharging, whereby the electrode reaction of charging and discharging proceeds.

When an electroconductive polymer such as polyaniline is employed as the positive electrode, counter ions of the active substance ions are carried on the positive electrode body during charging, and the counter ions of the active substance ions released from the positive electrode body during dischanging, whereby the electrode reaction proceeds.

As described above, the battery reaction accompanied with charging and discharging proceeds according to the combination of the electrode reaction of the positive electrode body and the negative electrode body.

The electrode for secondary battery of the present invention comprises an alkali metal composed mainly of lithium carried on a carrier comprising a mixture of the particles of the carbonaceous material as described above and a thermoplastic elastomer, which can be formed into a shape of flexible sheet-shaped electrode, and this can be applied in a coil shape to a cylindrical secondary battery, and also as the electrode for a thin sheet-shaped battery and a square battery, thereby providing an electrode enabling a secondary battery having high capacity, high output and excellent charging and discharging characteristics. In the present invention, the respective measurements of elemental analysis and X-ray wide angle diffraction were practiced according to the following methods.

Elemental analysis

A sample was dried under reduced pressure at 120° C. for about 15 hours, then dried by placing on a hot plate in a dry box at 100° C. for 1 hour. Subsequently, the dried sample was sampled in an aluminum cup in an argon atmosphere, and the carbon content was determined from the weight of the $CO_2$ gas generated by combustion, and the hydrogen content from the weight of the Hhd 2O generated. In Examples of the present invention as described below, measurement was conducted by use of Perkin Elmer 240 C Model Elemental Analyzer.

X-ray wide angle diffraction (1) Spacing ($d_{002}$) of the (002) plane and spacing ($d_{110}$) of the (110) plane:

As such, when the carbonaceous material is powder, or powdered by an agate mortar, high purity silicon powder for X-ray standard is mixed as internal standard substance in an amount of about 15 % by weight based on the sample, filled in a sample cell, and the wide angle X-ray diffraction curve is measured by the reflection system diffractometer method with the CuKo line monochromated by a graphite monochromator as the line source. For correction of the curve, none of the corrections concerned with the so-called Rorentz, polarizing light factor, absorption factor and atomic scattering factor were done, but the following simplified method was employed. That is, by drawing the baselines for the curve corresponding to (002) and (110) diffractions are drawn, the substantive intensity from the baseline is plotted again to obtain the corrected curves of the (002) plane and the (110) plane. The middle point of the segment of the line in parallel to the angle axis drawn at ⅔ of the peak height of the curve crossing the diffraction curve was determined, the angle of the middle point corrected with the internal standard, which was made 2-fold of the diffraction angle, and $d_{002}$ and $d_{110}$ were determined from the wavelength $\lambda$ of the CuKo line according to the Bragg's formula shown below.

$$d_{002} = \frac{\lambda}{2 \sin\theta} \, [\text{Å}]$$

$$d_{110} = \frac{\lambda}{2 \sin\theta'} \, [\text{Å}]$$

$\lambda$: 1.5418 Å

$\theta$ and $\theta''$: diffraction angles corresponding to $d_{002}$ and (2) Sizes of crystallines in the c-axis and a-axis directions: Lc; La:

In the corrected diffraction curves obtained in the previous item, by use of the so-called half-value width $\beta$ at the position of half of the peak height, the sizes of the crystallines in the c-axix and the a-axis were determined from the following formulae:

$$Lc = \frac{K \cdot \lambda}{\beta \cdot \cos\theta} \, [\text{Å}],$$

$$La = \frac{K \cdot \lambda}{\beta \cdot \cos\theta'} \, [\text{Å}],$$

For the shape factor K, 0.90 was employed. $\lambda$, $\theta$ and $\theta''$ have the same meanings as in the previous item.

Examples

EXAMPLE 1

Granules of a crystalline cellulose (average radius: about 1 mm) were set in an electrical heating furnace, elevated up to a temperature of 1000° C. at an elevation rate of 250° C./hour under nitrogen gas stream, and further maintained at 1000° C. for one hour.

Then, after left to cool, the resulting particles of the carbonaceous material were set in a separate electrical furnace, elevated up to 1800° C. at an elevation rate of 1000° C./hour under nitrogen gas stream, and further maintained at 1800° C. for one hour.

The carbonaceous material thus obtained was placed in an agate mortar of 500 ml, 2 balls made of an agate of 30 mm in diameter, 6 balls of an agate of 25 mm in diameter and 16 balls of an agate of 20 mm in diameter were placed therein, followed by pulverization for 3 minutes.

The carbonaceous material obtained has the characteristics shown below as the result of analysis of elemental analysis and X-ray wide angle diffraction, and measurements of particle size distribution and specific surface area.

Hydrogen/carbon (atomic ratio) = 0.04
$d_{002}$ = 3.59 Å, Lc = 14 Å, $a_0$(2 $d_{110}$) = 2.41 Å,
La = 25 Å, Volume average particle size = 35.8 μm,
Specific surface area (BET) = 8.2 m²/g.

A styrene-ethylene/butylene-styrene block copolymer (hydrogenated product of a styrene-butadiene-styrene block copolymer) having a number average molecular weight of about 50,000 and a styrene content of 30 % by weight was dissolved in toluene, the resulting solution and the particles of the carbonaceous material as described above were mixed in a stirred vessel, followed by evaporation of the solvent and drying, to give a mixture of the carbonaceous material particles and the styrene-ethylene/butylene-styrene block copolymer.

The ratios of the both were 95 % by weight of the carbonaceous material and 5 % by weight of the styrene-ethylene/butylene-styrene block copolymer.

The mixture was compression molded with a metal net made of Ni of 100 mesh as the core at 110 .C under a pressure of 100 kg/cm² to be formed into a sheet-shaped electrode with a thickness of 0.7 mm.

The sheet-shaped electrode had flexibility and flexural strength.

On the sheet-shaped electrode was laminated a lithium metal sheet as an opposite electrode with a nonwoven cloth of polypropylene as the separator interposed therebetween, and the composite was rolled into a coil shape as shown in FIG. 1 and housed in a cylindrical can made of a stainless steel.

The separator was impregnated with a propylene carbonate solution with a LiClO$_4$ concentration of 1 mole/liter, and the battery case was sealed to assemble a battery as shown in FIG. 1.

The battery has a constitution of semi-battery, and by charging and discharging of the battery, the performance of the electrode comprising the mixture of the carbonaceous material and the styrene-ethylene/butylene-styrene copolymer as the carrier can be grasped. That is, charging was effected to a battery voltage of 0.1 V at a constant current of 5 mA, then discharging to a battery voltage of 2.5 V at a constant current of 5 mA, and further preliminary charging and discharging practiced for 5 cycles under the same conditions.

Figure 2:
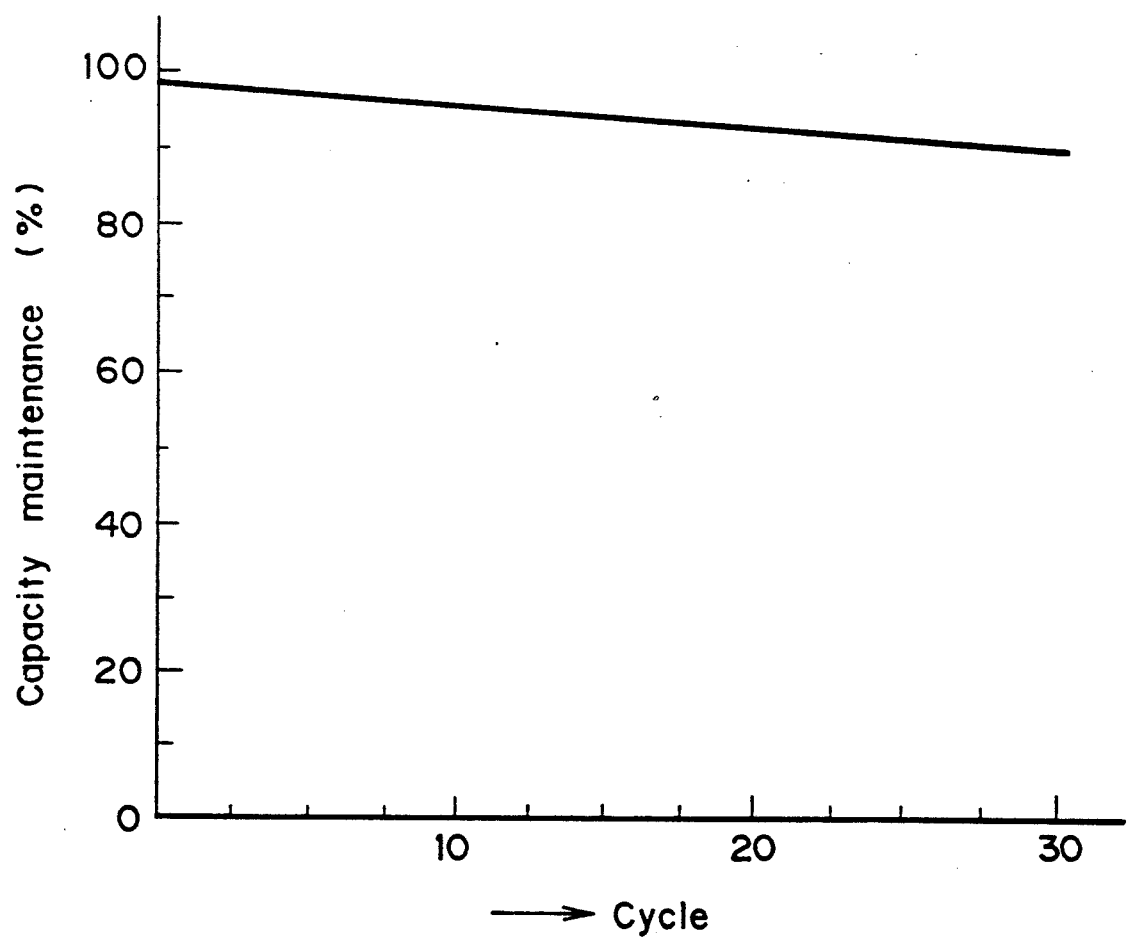
FIG. 2 is a graph showing the relationship between a charging and discharging cycle and capacity maintenance of the battery in Example 1.

Then, charging and discharging were repeated within the range from 0.1 V to 2.5 V of the battery voltage at a constant current of 5 mA, and the capacity maintenance of the battery in each cycle was measured. The results are shown in FIG. 2.

COMPARATIVE EXAMPLE 1

A material comprising the particles of the carbonaceous material prepared in the same manner as in Example 1 mixed with 5 % by weight of polyethylene powder with an average particle size of 2 μm was compression molded with a metal net made of Ni of 100 mesh as the core material at 120° C. under a pressure of 100 kg/cm² to be formed into a sheet-shaped electrode with a thickness of 0.7 mm.

The sheet-shaped electrode was poor in flexibility and flexural strength, and when rolled into a coil with the same constitution as in Example 1, the particles of the carbonaceous material were peeled off and the shape as the electrode could not be maintained.

EXAMPLE 2

In the same manner as in Example 1, granules were elevated up to 2100° C. and maintained at 2100° C. for one hour. Pulverization of the resulting carbonaceous material was carried out in the same manner as in Example 1 except for adding further 5 minutes of pulverization time.

Thus, carbonaceous material having the following characteristics can be obtained.

Hydrogen/carbon (atomic ratio) = 0.03
$d_{002}$ = 3.50 Å, LC = 20 Å, $a_O$ (2 $d_{110}$) = 2.42 Å, La = 33 Å, Volume average particle size = 15.7 μm, Specific surface area (BET) = 16.7 m²/g.

A styrene-isoprene-styrene block copolymer subjected to hydrogenation treatment (styrene content: 13 % by weight, specific gravity: 0.89) product of a styrene-isoprene-styrene block copolymer) was dissolved in toluene, and the particles of the carbonaceous material as described above were added to the solution and mechanically mixed.

Thus, a paste state mixture with a ratio of the carbonaceous material of 93 % by weight and the hydrogenated product of the styrene-isoprene-styrene copolymer of 7 % by weight was obtained.

The mixture was coated on both sides of a Ni foil having a thickness of 10 μm with thicknesses of each 80 μm and then the solvent was evaporated. The product was subjected to compression pressing by a roller. The resulting sheet-shaped electrode had flexibility and flexural strength.

By using the sheet-shaped electrode, the same cell as in Example 1 was constituted to evaluate electrode characteristics. Electrode characteristics were evaluated in the same manner as in Example 1 except for changing a current at charging and discharging to 10 mA, and the results are summarized in Table 1.

COMPARATIVE EXAMPLE 2

In the same manner as in Example 1, a sheet-shaped electrode was formed by using a mixture in which 40 % by weight of the styrene-ethylene/butylene-styrene block copolymer is adhered to 60 % by weight of the carbonaceous material.

By using the sheet-shaped electrode, a cell having the same constitution as in Example 1 was constituted to evaluate electrode characteristics.

Electrode characteristics were evaluated in the same manner as in Example 1 except for changing a current at charging and discharging to 10 mA, and the results are summarized in Table 1.

EXAMPLE 3

In the same manner as in Example 1, a mixture in which 12% by weight of the styrene-ethylene/butylene-styrene block copolymer was adhered to 88 % by weight of the carbonaceous material was synthesized.

Then, 40% by weight of the carbonaceous material to which the styrene-ethylene/butylene-styrene block copolymer was adhered and 60% by weight of particles of the carbonaceous material to which no elastomer was adhered were mechanically mixed and molded to a sheet-shaped electrode in the same manner as in Example 1. The resulting sheet-shaped electrode had flexibility and flexural strength.

By using the sheet-shaped electrode, the same cell as in Example 1 was constituted to evaluate electrode characteristics. Electrode characteristics were evaluated in the same manner as in Example 1 except for changing a current at charging and discharging to 10 mA, and the results are summarized in Table 1.

EXAMPLE 4

In a reactor were charged 108 g of ortho-cresol, 32 g of paraformaldehyde and 240 g of ethylcellosolve with 10 g of sulfuric acid, and the mixture was reacted under stirring at 115° C. for 4 hours. After completion of the reaction, the reaction mixture was neutralized to obtain 115 g of a linear high molecular weight novolac resin (number average molecular weight: 2600). To the resin was added 10% by weight of hexamine to effect cross-linking treatment at 200 ° C. for 2 hours to obtain a phenol resin.

In the same manner as in Example 1, the above phenol resin was carbonized and then pulverized to obtain a carbonaceous material having the following characteristics.

Hydrogen/carbon (atomic ratio) = 0.04
$d_{002}$ = 3.68 Å, Lc = 12 Å, $a_O$ (2 $d_{110}$) = 2.41 Å,
La = 19 Å, Volume average particle size = 20.3 μm,
Specific surface area (BET) = 12.3 m²/g. A latex of a styrene-butadiene rubber having an average particle size of 0.2μm and particles of the above carbonaceous material were mixed to obtain an emulsion containing 92% by weight of the carbonaceous material and 8 % by weight of the styrene-butadiene rubber.

This emulsion was coated on both sides of a Ni foil having a thickness of 10 μm with thicknesses of each 80 μm and then dried. The product was subjected to compression pressing by a roller to mold a sheet-shaped electrode. The resulting sheet-shaped electrode had flexibility and flexural strength.

By using the sheet-shaped electrode, the same cell as in Example 1 was constituted to evaluate electrode characteristics. Electrode characteristics were evaluated in the same manner as in Example 1 except for changing a current at charging and discharging to 10 mA, and the results are summarized in Table 1.

TABLE 1

| | Evaluated item | | | | | |
|---|---|---|---|---|---|---|
| | 5 Cycles | | | 30 Cycles | | |
| Sample | Charged capacity mAh | Discharged capacity mAh | Coulomb efficiency % | Charged capacity mAh | Discharged capacity MaH | Coulomb efficiency % |
| Example 2 | 420 | 412 | 98.2 | 422 | 415 | 98.3 |
| Comparative example 2 | 270 | 136 | 50.3 | 260 | 52 | 20.1 |
| Example 3 | 430 | 423 | 98.4 | 435 | 428 | 98.5 |
| Example 4 | 418 | 411 | 98.3 | 420 | 413 | 98.4 |

EXAMPLE 5

(1) Synthesis of negative electrode carrier material

In the same manner as in Example 1, particles of a carbonaceous material were synthesized.

In the same manner as in Example 1, the styrene-ethylene/butylene-styrene block copolymer was dissolved in toluene and the solution was sprayed in a dry chamber from a liquid coating nozzle. Simultaneously, particles of the above carbonaceous material were supplied and dispersed into the coating nozzle by a screw feeder and further supplying to the dry chamber to obtain particles of the carbonaceous material to which a solution dissolved therein the styrene-ethylene/butylene-styrene block copolymer was adhered.

In the dry chamber, toluene was evaporated by hot-air stream to obtain particles of the carbonaceous material on the surface of which was adhered 5% by weight of the styrene-ethylene/butylene-styrene block copolymer.

This product was molded to obtain a sheet-shaped electrode. The resulting sheet-shaped electrode had flexibility and flexural strength.

(2) Carrying lithium on the above carrier material

Using the above carrier material as one electrode and lithium metal as opposite electrode, electrolysis treatment was carried out in a propylene carbonate solution containing 1 mole/liter of LiC104 to obtain a negative electrode body by carrying lithium which is an active substance. Conditions of the electrolysis were the bath temperature of 20° C. and current density of 0.7 ml/cm² whereby lithium corresponding to 500 mAh was carried on the negative electrode body.

(3) Preparation of positive electrode 10 g of $MnO_2$ powder calcinated at 470° C. and 1 g of powdery polytetrafluoroethylene were kneaded and the resulting kneaded product was subjected to roll molding to obtain a sheet having a thickness of 0.4 mm.

(4) Assembly of battery

A sheet-shaped electrode carried lithium on the carrier material comprising particles to which a hydrogenated product of the styrene-ethylene/butylene-styrene block copolymer was adhered on the surface of the above mentioned carbonaceous material was used as a negative electrode and after a polypropylene nonwoven fabric was mounted as the separator, a sheet-shaped electrode comprising the above $MnO_2$ was laminated as a positive electrode. This laminate was mounted in a cylindrical can made of stainless with a shape of a spiral by rolling up it.

By impregnating a propylene carbonate solution containing 1 mole/liter of $LiClO_4$ to the separator, and sealing the battery cell to assemble a battery cell shown in FIG. 1.

(5) Characteristics of the battery

With respect to the battery thus prepared, discharging was carried out with a constant current of 20 mA until the battery voltage became 1.0 V. Thereafter, charging was carried out with a constant current of 20 mA until the battery voltage became 3.3 V, and then preliminary charging and discharging was practiced for 5 cycles with voltage regulations of 3.3 V upper limit and 1.8 V lower limit and the constant current of 20 mA.

Thereafter, charging and discharging were repeated between 3.3 V and 1.8 V with a constant current of 20 mA to carry out cycle evaluation. Characteristics at 6 cycles and at 50 cycles are shown in Table 2.

COMPARATIVE EXAMPLE 3

A battery was constituted in the same manner as in Example 5 except for using a lithium metal sheet in place of the negative electrode in Example 5.

Characteristics of the battery are shown in Table 2.

TABLE 2

| | Evaluated item | | | | | |
|---|---|---|---|---|---|---|
| | 6 Cycles | | | 50 Cycles | | |
| Sample | Charged capacity mAh | Discharged capacity mAh | Coulomb efficiency % | Charged capacity mAh | Discharged capacity MaH | Coulomb efficiency % |
| Example 5 | 430 | 424 | 98.5 | 435 | 429 | 98.6 |
| Comparative example 3 | 430 | 399 | 92.7 | 410 | 197 | 48 |

The electrode for secondary battery of the present invention is a sheet-shaped electrode excellent in flexibility and flexural strength, which is an electrode excellent in charging and discharging cycle life capable of repeating smoothly carrying and releasing of lithium or an alkali metal composed mainly of lithium which is the active substance.

We claim:

1. An electrode for a secondary battery, comprising a net or sheet made of a metal having laminated thereon a mixture comprising 85 to 99.9% by weight of a carbonaceous material and 0.1 to 15% by weight of an elastomer, said carbonaceous material having a hydrogen/carbon (H/C) atomic ratio of less than 0.15, a spacing ($d_{002}$) of the (002) plane according to the X-ray wide angle diffraction method of 3.37 Å to 3.75 Å, a volume average particle size of 0.5 $\mu$m to 150 $\mu$m and a total fine pore volume of $1.5 \times 10^{-3}$ ml/g or more, said carbonaceous material carrying an active substance comprising lithium, said electrode having a thickness of 5 to 500 $\mu$m and being rolled in the shape of a spiral.

2. An electrode for a secondary battery according to claim 1, wherein the carbonaceous material has a G value as defined by the following formula of less than 2.5 in the Raman spectrum analysis by use of an argon ion laser beam with a wavelength of 5145 Å:

$$G = \frac{\text{integrated value of spectrum intensity in the wave number region of } 1580 \pm 100 \text{ cm}^{-1}}{\text{integrated value of spectrum intensity in the wave number region of } 1360 \pm 100 \text{ cm}^{-1}}$$

3. The electrode for a secondary battery according to claim 1 which is a compression molded product of a mixture of particles of the carbonaceous material and particles of the elastomer.

4. The electrode for a secondary battery according to claim 1, which is a product obtained by mixing and drying particles of the carbonaceous material and an emulsion of the elastomer.

5. The electrode for a secondary battery according to claim 1, which is a product obtained by coating a solution of the elastomer onto the surface of particles of the carbonaceous material, drying the coated product and then pressurizing it.

6. The electrode for a secondary battery according to claim 1, which is a product obtained by mixing particles of the carbonaceous material coated on the surface with a solution of the elastomer and uncoated particles of the carbonaceous material, followed by pressurization under heating.

7. The electrode for a secondary battery according to claim 1, which is a product obtained by pressurizing under heating a mixture of 4/5 or less in weight ratio of particles of the carbonaceous material coated on the surface with a solution of the elastomer and 1/5 or more in weight ratio of uncoated particles of the carbonaceous material.

8. The electrode for a secondary battery according to claim 1, wherein the elastomer is a thermoplastic elastomer.

9. The electrode for a secondary battery according to claim 8, wherein the elastomer is a styrene type thermoplastic polymer comprising a block copolymer of styrene and a conjugated diene or a hydrogenated product thereof.

10. The electrode for a secondary battery according to claim 9, wherein the styrene type thermoplastic elastomer has a molecular weight of 2,000 to 50,000.

11. The electrode for a secondary battery according to claim 1, wherein he average fine pore radius of the carbonaceous material is 8 to 100 Å.

12. The electrode for a secondary battery according to claim 3, wherein said elastomer has particles of an average particle size of ½ or less of the average particle size of the particles of the carbonaceous material.

13. The electrode for a secondary battery according to claim 5, wherein the surface of particles of said carbonaceous material is coated by the elastomer with a thickness of ⅓ or less of the average particle size of particles of the carbonaceous material.

14. The electrode for a secondary battery according to claim 5, wherein the surface of particles of said carbonaceous material is coated by the elastomer over the surface area of 4/5 of the whole surface area thereof.

15. The electrode for a secondary battery according to claim 8, wherein he thermoplastic elastomer has a molecular weight of 2000 to 500,000.

16. The electrode for a secondary battery according to claim 1, wherein the net or sheet is made of nickel or copper.

17. The electrode for a secondary battery according to claim 2, wherein the hydrogen/carbon atomic ratio is less than 0.07; the spacing ($d_{002}$) of the (001) plane is 3.41 to 3.70 Å; the G value is less than 2.0; the volume average particle size is 2 to 100 μm; the total fine pore volume is $2.0 \times 10^{-3}$ ml/g or more; the carbonaceous material has an average fine pore radius of 8 to 100 Å; the carbonaceous material has a crystallite size in the c-axis direction of 220 Å or less; the carbonaceous material has a two-fold distance $a_0 (=2d_{110})$ of the spacing ($d_{110}$) of the (110) plane in an x-ray wide angle diffraction analysis of 2.38 to 2.47 Å and a crystallite size in the a-axis direction of 10 Å or more; the elastomer is a block copolymer of styrene and a conjugated diene, or a hydrogenation product thereof, having a molecular weight of 2000 to 500,000; and the net or sheet is made of nickel or copper.

18. The electrode for a secondary battery according to claim 2, wherein the hydrogen/carbon ratio is less than 0.05; the spacing ($d_{002}$) of the (002) plane is 3.4 to 3.70 Å; the g value is 0.2 to less than 1.2; the volume average particle size is 5 to 30 μm; the total fine pore volume is $3.0 \times 10^{-3}$ ml/g to $8 \times 10^{-2}$ ml/g; the carbonaceous material has an average fine pore radius of 10 to 80 Å; the carbonaceous material has a crystallite size in the c-axis direction of 5 to 150 Å; the carbonaceous material has a two-fold distance $a_0 (=2d_{110})$ of the spacing ($d_{110}$) of the (110) plane in an x-ray wide angle diffraction analysis of 2.39 to 2.46 Å and a crystallite size of in the a-axis direction of 15 to 150 Å, the elastomer is a block copolymer of styrene and a conjugated diene, or a hydrogenation product thereof, having a molecular weight of 2000 to 500,000; and the net or sheet is made of nickel or copper.

19. The electrode for a secondary battery according to claim 2, wherein the total fine pore volume is $4.0 \times 10^{-3}$ ml/g to $3 \times 10^{-2}$ ml/g; the average fine pore radius is 12 to 60 Å; the crystallite size in the c-axis direction is 10 to 80 Å; the crystallite size in the a-axis is 19 Å is 70 Å; the elastomer has a molecular weight of 5,000 to 300,000; said material comprising lithium being an alloy or lithium and a metal M selected from the group consisting of Al, Pb, Zn, Sn, Bi, In, Mg, Ga, Cd, Ag, Si, B, Au, Pt, Pd and Sb, said M in said alloy being in an amount of 5 to 50 weight % of said alloy.

* * * * *